(12) United States Patent
Sato et al.

(10) Patent No.: US 11,235,677 B2
(45) Date of Patent: Feb. 1, 2022

(54) VEHICLE-INSTALLED BATTERY CHARGE SYSTEM

(71) Applicant: Toyota Jidosha Kabushiki Kaisha, Toyota (JP)

(72) Inventors: Masaaki Sato, Susono (JP); Satoshi Kondo, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

(21) Appl. No.: 16/720,762

(22) Filed: Dec. 19, 2019

(65) Prior Publication Data
US 2020/0207233 A1    Jul. 2, 2020

(30) Foreign Application Priority Data
Dec. 27, 2018    (JP) .............................. JP2018-244594

(51) Int. Cl.
| | | |
|---|---|---|
| *H02J 7/00* | (2006.01) | |
| *H02J 7/14* | (2006.01) | |
| *B60L 53/62* | (2019.01) | |
| *B60L 50/64* | (2019.01) | |
| *B60L 58/26* | (2019.01) | |
| *B60L 58/18* | (2019.01) | |
| *B60L 53/16* | (2019.01) | |
| *B60L 53/31* | (2019.01) | |
| *B60L 53/35* | (2019.01) | |

(52) U.S. Cl.
CPC ............... *B60L 53/62* (2019.02); *B60L 50/64* (2019.02); *B60L 53/16* (2019.02); *B60L 53/31* (2019.02); *B60L 53/35* (2019.02); *B60L 58/18* (2019.02); *B60L 58/26* (2019.02); *H02J 7/0013* (2013.01); *H02J 7/0045* (2013.01); *H02J 7/0047* (2013.01); *B60L 2240/545* (2013.01); *B60L 2240/547* (2013.01); *B60L 2240/549* (2013.01)

(58) Field of Classification Search
USPC ........................................................ 320/132
See application file for complete search history.

(56) References Cited

U.S. PATENT DOCUMENTS

| | | | | |
|---|---|---|---|---|
| 9,487,210 | B2 * | 11/2016 | Yamamoto ............ | B60W 10/06 |
| 2014/0062394 | A1 * | 3/2014 | Khan .................... | B60L 53/14 |
| | | | | 320/108 |
| 2014/0253034 | A1 * | 9/2014 | Kurimoto ............... | B60L 53/30 |
| | | | | 320/109 |
| 2015/0174998 | A1 * | 6/2015 | Okada ................... | B60L 3/0046 |
| | | | | 701/22 |

(Continued)

FOREIGN PATENT DOCUMENTS

JP    2011-244630 A    12/2011

*Primary Examiner* — Alexis B Pacheco
(74) *Attorney, Agent, or Firm* — Dinsmore & Shohl LLP

(57) ABSTRACT

A vehicle-installed battery charge system of the disclosure starts executions of processes to electrically charge batteries of vehicles in accordance with a predetermined charge order. The charge system acquires a value correlating with a charge speed of the battery now charged as a charge speed correlation value of the battery now charged and ends the execution of the process to charge the battery now charged when the charge speed correlation value of the battery now charged indicates that the charge speed of the battery now charged becomes equal to or lower than a predetermined charge speed threshold.

18 Claims, 10 Drawing Sheets

(56) References Cited

U.S. PATENT DOCUMENTS

| | | | | |
|---|---|---|---|---|
| 2016/0176310 A1* | 6/2016 | Sato | ........................ | B60L 53/00 |
| | | | | 180/65.25 |
| 2018/0287404 A1* | 10/2018 | Small, Jr. | .............. | H02J 7/0021 |
| 2018/0312158 A1* | 11/2018 | Morimoto | ............. | B60W 20/12 |

* cited by examiner

VEHICLE-INSTALLED BATTERY CHARGE SYSTEM

CROSS-REFERENCE TO RELATED APPLICATION

This application claims priority to Japanese Patent Application No. 2018-244594 filed on Dec. 27, 2018, incorporated herein by reference in its entirety.

BACKGROUND

Field

The disclosure relates to a vehicle-installed battery charge system.

Description of the Related Art

There is known a parking facility provided with a vehicle-installed battery charge system for electrically charging batteries installed in vehicles such as an electric vehicle (see JP 2011-244630 A). The vehicle-installed battery charge system described in JP 2011-244603 A determines the order of electrically charging the batteries and charges the batteries with electric power in accordance with the determined order when the vehicle-installed battery charge system cannot charge the batteries of all vehicles parked in the parking facility and requested to be electrically charged at the same time, Hereinafter, the vehicle-installed battery charge system described in JP 2011-244603 twill be referred to as "the known charge system".

The known charge system ends an execution of a process to electrically charge the battery now charged and starts the execution of the process to electrically charge the battery scheduled to be charged next when (i) a predetermined time elapses from starting the execution of the process to electrically charged the battery now charged, or (ii) a predetermined amount of electric current has been supplied to the battery now charged, or (iii) a predetermined amount of the electric power has been supplied to the battery now charged.

In general, a battery charge speed decreases as a battery charge amount increases. The battery charge amount is an amount of the electric power which has been stored in the battery, and the battery charge speed is the amount of the electric power charged to the battery per unit time. As described above, the known charge system changes the batteries to be electrically charged, for example, when the predetermined time elapses. Therefore, the known charge system changes the batteries to be electrically charged without considering a fact that the battery charge speed decreases as the battery charge amount increases.

Thus, the known charge system may continue to electrically charge the battery even when the battery charge speed is low. In this case, a total of the amounts of the electric power charged to the batteries for a constant time decreases.

SUMMARY

The embodiments herein have been made for solving a problem described above. An object of the present disclosure is to provide a vehicle-installed battery charge system which electrically charges batteries sequentially with a large total amount of the electric power supplied to the batteries for a predetermine time.

A vehicle-installed battery charge system according to the disclosure comprises a battery charge equipment and an electronic control unit. The battery charge equipment is used for electrically charging batteries installed in vehicles. The electronic control unit for controlling executions of processes to electrically charge the batteries, respectively by the battery charge equipment.

The electronic control unit is configured to determine the order of executing the processes to electrically charge the batteries as a predetermined charge order.

The electronic control unit is further configured to start the executions of the processes to electrically charge the batteries in accordance with the predetermined charge order:

The electronic control unit is further configured to acquire a value correlating with a charge speed of the battery now charged as a charge speed correlation value of the battery now charged.

The electronic control unit is further configured to end the execution of the process to charge the battery now charged when the charge speed correlation value of the battery now charged indicates that the charge speed of the battery now charged becomes equal to or lower than a predetermined charge speed threshold.

With the disclosure, the execution of the process to electrically charge the battery now charged is ended, and the execution of the process to electrically charge the battery scheduled to be charged next is started when the charge speed of the battery now charged decreases to the predetermined charge speed threshold. Thus, the batteries are electrically charged with the charge speeds of each batteries being maintained at the charge speed greater than the predetermined charge speed threshold. As a result, each battery can be charged with the large amount of the electric power for the predetermined time.

According to an aspect of the disclosure, the electronic control unit may be further configured to acquire a charge rate of the battery now charged as the charge speed correlation value. The charge rate of the battery now charged is a ratio of an amount of electric power which has been stored in the battery now charged relative to an upper limit of the amount of the electric power which can be maximally stored in the battery now charged.

According to this aspect, the electronic control unit may be further configured to determines that the charge speed correlation value indicates that the charge speed of the battery now charged becomes equal to or lower than the predetermined charge speed threshold when the charge rate of the battery now charged becomes equal to or greater than a predetermined charge rate threshold.

With this aspect of the disclosure, the vehicles having the batteries to be electrically charged, respectively can be changed, based on the charge rate of the battery now charged.

According to another aspect of the disclosure, the electronic control unit may be further configured to acquire a temperature of the battery now charged as the charge speed correlation value.

According to this aspect, the electronic control unit may be further configured to determines that the charge speed correlation value indicates that the charge speed of the battery now charged becomes equal to or lower than the predetermined charge speed threshold when the temperature of the battery now charged becomes equal to or higher than a predetermined battery temperature threshold.

With this aspect of the disclosure, the vehicles having the batteries to be electrically charged, respectively, can be changed, based on the temperatures of the battery now charged.

According to further another aspect of the disclosure, the electronic control unit may be further configured to acquire a charge amount of the battery now charged as the charge speed correlation value. The charge amount of the battery now charged is an amount of electric power which has been stored in the battery now charged.

According to this aspect, the electronic control unit may be further configured to determines that the charge speed correlation value indicates that the charge speed of the battery now charged becomes equal to or lower than the predetermined charge speed threshold when the charge amount of the battery now charged becomes equal to or greater than a predetermined charge amount threshold.

With this aspect of the disclosure, the vehicles having the batteries to be electrically charged, respectively can be changed, based on the charge amount of the battery now charged.

According to further another aspect of the disclosure, the electronic control unit may be further configured to acquire an output electric, power amount as the charge speed correlation value. The output electric power amount is an amount of electric power which is output from the battery charge equipment to the battery now charged.

According to this aspect, the electronic control unit may be further configured to determines that the charge speed correlation value indicates that the charge speed of the battery now charged becomes equal to or lower than the predetermined charge speed threshold when the output electric power amount becomes equal to or smaller than a predetermined output electric power amount threshold.

According to further another aspect of the disclosure, the electronic control unit may be further configured to acquire estimated charge-end time of the battery now charged as the charge speed correlation value. The estimated charge-end time of the battery now charged is time estimated to be required for an amount of electric power stored in the battery now charged to reach a target amount.

According to this aspect, the electronic control unit may be further configured to determines that the charge speed correlation value indicates that the charge speed of the battery now charged becomes equal to or lower than the predetermined charge speed threshold when the estimated charge-end time of the battery now charged becomes equal to or longer than a predetermined estimated charge-end time threshold.

According to further another aspect of the disclosure, the electronic control unit may be further configured to acquire a remaining chargeable amount of the battery now charged as the charge speed correlation value. The remaining chargeable amount of the battery now charged is a difference between an amount of electric power stored in the battery now charged and an upper limit of the amount of the electric power which can be maximally stored in the battery now charged.

According to this aspect, the electronic control unit may be further configured to determines that the charge speed correlation value indicates that the charge speed of the battery now charged becomes equal to or lower than the predetermined charge speed threshold when the remaining chargeable amount of the battery now charged becomes equal to or smaller than a predetermined remaining chargeable amount threshold.

According to further another aspect of the disclosure, the electronic control unit may be further configured to acquire a cooling water flow rate of the battery now charged as the charge speed correlation value. The cooling water flow rate of the battery now charged is a flow rate of cooling water requested to be supplied to the battery now charged to cool the battery now charged According to this aspect, the electronic control unit may be further configured to determines that the charge speed correlation value indicates that the charge speed of the battery now charged becomes equal to or lower than the predetermined charge speed threshold when the cooling water flow rate of the battery now charged becomes equal to or greater than a predetermined cooling water flow rate threshold.

According to further another aspect of the disclosure, the electronic control unit may be further configured to acquire a charge rate difference of the battery now charged as the charge speed correlation value. The charge rate difference of the battery now charged is a difference of a charge ratio of the battery now charged relative to the charge ratio of the battery scheduled to be charged next. The battery charge ratio of the battery now charged is a ratio of an amount of electric power which has been stored in the battery now charged relative to an upper limit of the amount of the electric power which can be maximally stored in the battery now charged. The charge ratio of the battery scheduled to be charged next is the ratio of the amount of the electric power which has been stored in the battery scheduled to be charged next relative to an upper limit of the amount of the electric, power which can be maximally stored in the battery scheduled to be charged next.

According to this aspect, the electronic control unit may be further configured to determines that the charge speed correlation value indicates that the charge speed of the battery now charged becomes equal to or lower than the predetermined charge speed threshold when the charge rate difference of the battery now charged becomes equal to or greater than a predetermined charge rate difference threshold.

With this aspect of the disclosure, the vehicles having the batteries to be electrically charged, respectively can be changed, based on the charge rate difference of the battery now charged.

According to further another aspect of the disclosure, the electronic control unit may be further configured to acquire a battery temperature difference of the battery now charged as the charge speed correlation value. The battery temperature difference of the battery now charged is a difference of a temperature of the battery scheduled to be charged next relative to the temperature of the battery now charged.

According to this aspect, the electronic control unit may be further configured to determines that the charge speed correlation value indicates that the charge speed of the battery now charged becomes equal to or lower than the predetermined charge, speed threshold when the battery temperature difference of the battery now charged becomes equal to or greater than a predetermined battery temperature difference threshold.

With this aspect of the disclosure, the vehicles having the batteries to be electrically charged, respectively can be changed, based on the battery temperature difference of the battery now charged.

According to further another aspect of the disclosure, the electronic control unit may be further configured to acquire a charge amount difference of the battery now charged as the charge speed correlation value. The charge amount difference of the battery now charged is a difference of an amount of electric power which has been stored in the battery scheduled to be charged next relative to the amount of the electric power which has been stored in the battery now charged.

According to this aspect, the electronic control unit may be further configured to determines that the charge speed correlation value indicates that the charge speed of the battery now charged becomes equal to or lower than the predetermined charge speed, threshold when the charge amount difference of the battery now charged becomes equal to or greater than a predetermined charge amount difference threshold.

With this aspect of the disclosure, the vehicles having the batteries to be electrically charged, respectively can be changed, based on the charge amount difference of the battery now charged.

According to further another aspect of the disclosure, the electronic control unit may be further configured to acquire an output electric power amount difference as the charge speed correlation value. The output electric power amount difference is a difference of an output electric power amount of electric power which is output from the battery charge equipment to the battery now charged relative to the output electric amount of the electric power which is estimated to be output from the battery charge equipment to the battery scheduled to be charged next.

According to this aspect, the electronic control unit may be further configured to determines that the charge speed correlation value indicates that the charge speed of the battery now charged becomes equal to or lower than the predetermined charge speed threshold when the output electric power amount difference becomes equal to or greater than a predetermined output electric power amount difference threshold.

According to further another aspect of the disclosure, the electronic control unit may be further configured to acquire an estimated charge-end time difference of the battery now charged as the charge speed correlation value. The estimated charge-end time difference of the battery now charged is a difference of time estimated to be required for an amount of electric power stored in the battery scheduled to be charged next to reach a target amount for the battery scheduled to be charged next relative to the time estimated to be required for the amount of the electric power stored in the battery now charged to reach a target amount for the battery now charged.

According to this aspect, the electronic control unit may be further configured to determines that the charge speed correlation value indicates that the charge speed of the battery now charged becomes equal to or lower than the predetermined charge speed threshold when the estimated charge-end time difference of the battery now charged becomes equal to or greater than a predetermined estimated charge-end time difference threshold.

According to further another aspect of the disclosure, the electronic control unit may be further configured to acquire a remaining chargeable amount difference of the battery now charged as the charge speed correlation value. The remaining chargeable amount difference of the battery now charged is a difference of a remaining chargeable amount of the battery now charged relative to the remaining chargeable amount of the battery scheduled to be charged next. The remaining chargeable amount of the battery now charged is a difference between an amount of electric power stored in the battery now charged and an upper limit of the amount of the electric power which can be maximally stored in the battery now charged. The remaining chargeable amount of the battery scheduled to be charged next is a difference between the amount of the electric power stored in the battery scheduled to be charged next and an upper limit of the amount of the electric power which can be maximally stored in the battery scheduled to be charged next.

According to this aspect, the electronic control unit may be further configured to determines that the charge speed correlation value indicates that the charge speed of the battery now charged becomes equal to or lower than the predetermined charge speed threshold when the remaining chargeable amount difference of the battery now charged becomes equal to or greater than a predetermined remaining chargeable amount difference threshold.

According to further another aspect of the disclosure, the electronic control unit may be further configured to acquire a cooling water flow rate difference of the battery now charged as the charge speed correlation value. The cooling water flow rate difference of the battery now charged is a difference of a flow rate of cooling water requested to be supplied to the battery scheduled to be charged next to cool the battery scheduled to be charged next relative to the flow rate of the cooling water requested to be supplied to the battery now charged to cool the battery now charged.

According to this aspect, the electronic control unit may be further configured to determines that the charge speed correlation value indicates that the charge speed of the battery now charged becomes equal to or lower than the predetermined charge speed threshold when the cooling water flow rate difference of the battery now charged becomes equal to or greater than a predetermined cooling water flow rate difference threshold.

According to further another aspect of the disclosure, the battery charge equipment may include a connection arm which connects a charge connector of a charge cable used for electrically charging the battery to a charge inlet of the vehicle and disconnects the charge connector from the charge inlet.

According to this aspect, the electronic control unit may be further configured to disconnect the charge connector from the charge inlet of the vehicle having the battery now charged by the connection arm when the electronic control unit ends the execution of the process to electrically charge the battery now charged.

According to this aspect, the electronic control unit may be further configured to connect the disconnected charge connector to the charge inlet of the vehicle having the battery scheduled to be charged next by the connection arm.

According to this aspect, the electronic control unit is further configured to start the execution of the process to electrically charge the battery scheduled to be charged next.

With this aspect of the disclosure, the charge connector can be automatically disconnected from the charge inlet of the vehicle having the battery now charged by the connection arm and automatically connected to the charge inlet of the vehicle having the battery scheduled to be charged next when the process to electrically charge the battery now charged is ended.

According to further another aspect of the disclosure, the electronic control unit may be further configured to charge a user of the vehicle a higher fee for electrically charging the battery when the charge speed correlation value is small, compared with when the charge speed correlation value is large.

With this aspect of the disclosure, the amount of money to be paid by the user decreases as the charge speed decreases, Thus, it can be expected to decrease the number of the users who desire to electrically charge the batteries until the charge speed decreases to a certain low speed. As a result, the batteries can be electrically charged with the high charge speed as a whole.

According to further another aspect of the disclosure, the electronic control unit may be further configured to determine the order of executing the processes to electrically charge the batteries such that the process to electrically charge the battery requested to be electrically charged at an earlier point of time is executed early.

The elements of the present disclosure are not limited to the elements of the embodiment defined by the reference symbols. The other objects, features and accompanied advantages of the present disclosure can be easily understood from the description of the embodiment of the present disclosure along with the drawings.

DETAILED DESCRIPTION

Below, a vehicle-installed battery charge system according to an embodiment of the disclosure will be described with reference to the drawings. Hereinafter, the vehicle-installed battery charge system according to the embodiment of the disclosure will be referred to as "the embodiment charge system".

Figure 1:
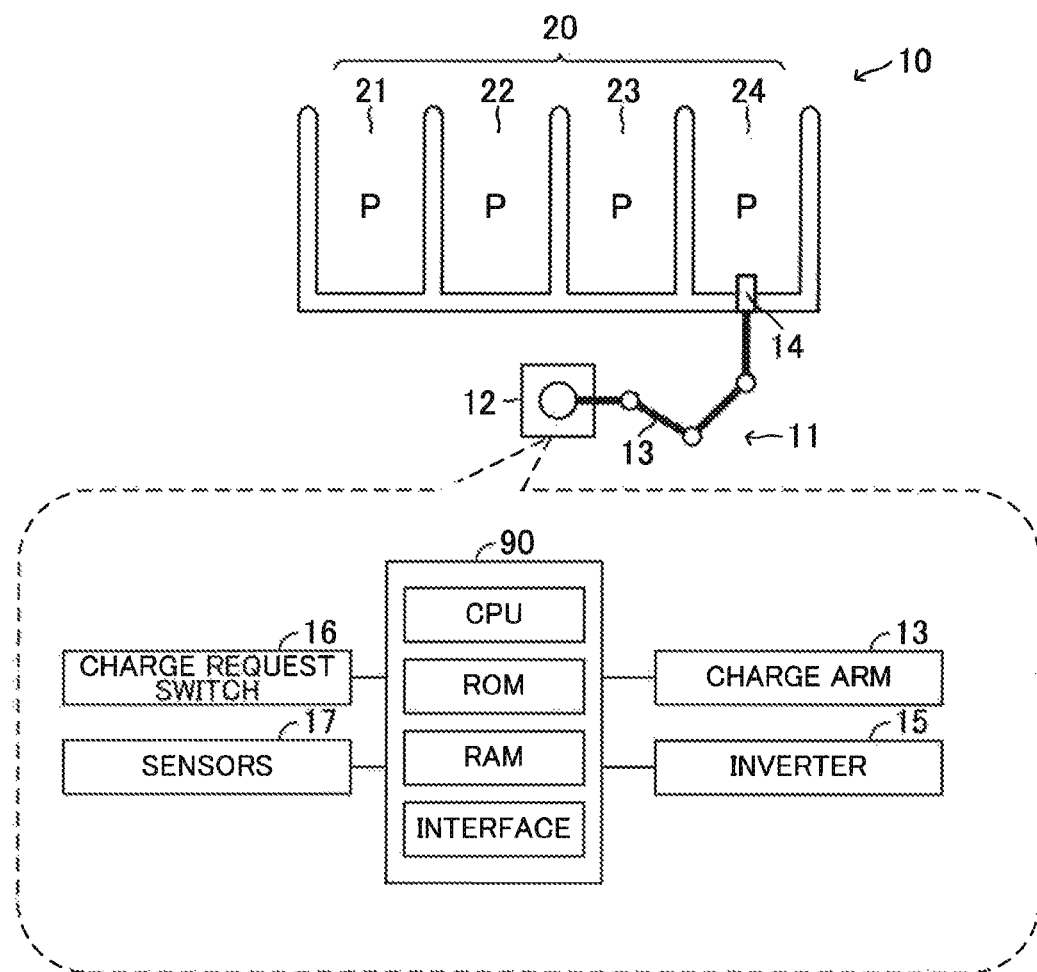
FIG. 1 is a view for showing a vehicle-installed battery charge system according to an embodiment of the disclosure, a battery charge equipment of the vehicle-installed battery charge system according to an embodiment of the disclosure, etc.
Figure 2:
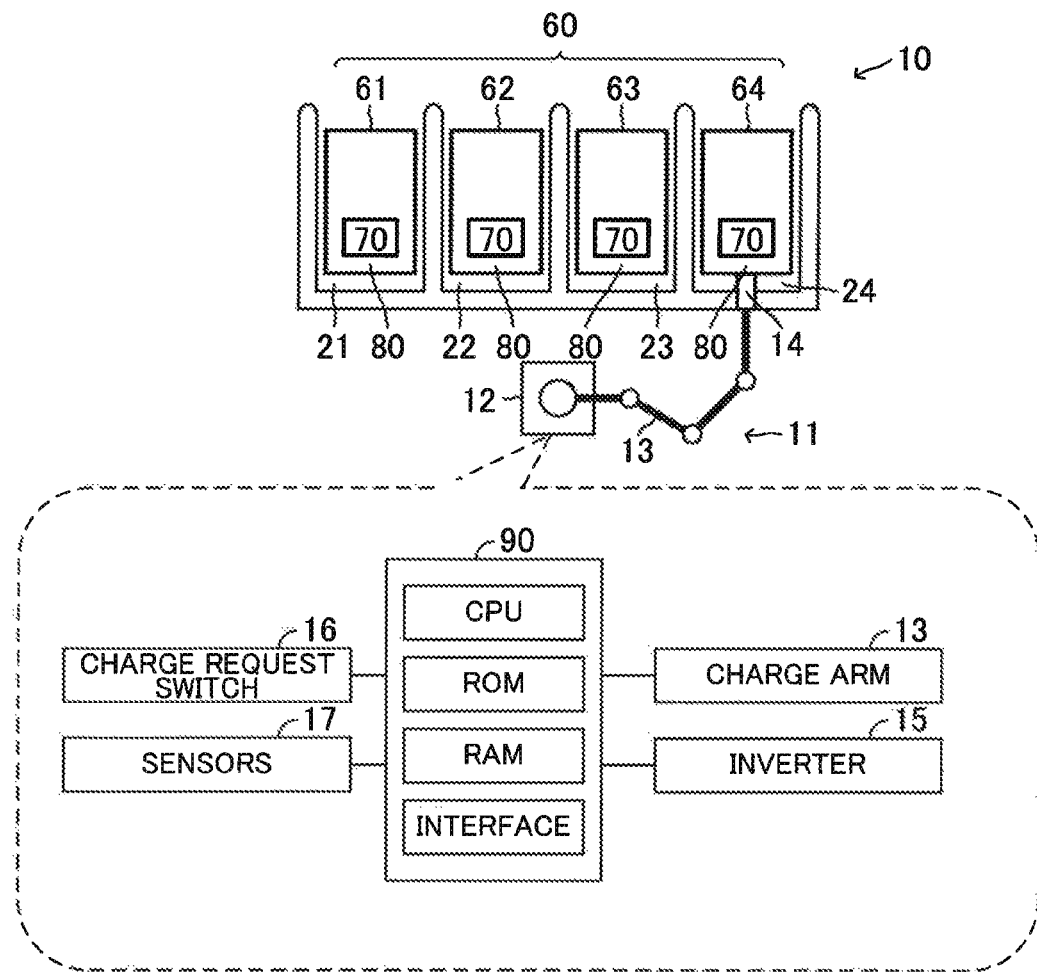
FIG. 2 is a view similar to FIG. 1 in which vehicles are parked in a parking facility shown in FIG. 1.

As shown in FIG. 1, the embodiment charge system includes a battery charge equipment 11. The battery charge equipment 11 is provided in a parking facility 10. Four parking spaces 20 are provided in the parking facility 10. Therefore, four vehicles 60 can be maximally parked in the parking facility 10 as shown, in FIG. 2.

Hereinafter, the leftmost parking, space 20 in the drawings will be referred to as "the first parking space 21", the parking space 20 right next to the first parking space 21 will be referred to as "the second parking space 22", the parking space 20 right next to the second parking space 22 will be referred to as "the third parking space 23", and the parking space 20 right next to the third parking space 23 will be referred to as "the fourth parking space 24". Further, the vehicle 60 parked in the first parking space 21 will be referred to as "the first vehicle 61", the vehicle 60 parked in the second parking space 22 will be referred to as "the second vehicle 62", the vehicle 60 parked in the third parking space 23 will be referred to as "the third vehicle 63", and the vehicle 60 parked in the fourth parking space 24 will be referred to as "the fourth vehicle 64".

The vehicle 60 charged by the battery charge equipment 11 includes a rechargeable battery 70 for storing electric power. The vehicle 60 is, for example, a plug-in hybrid vehicle (PHV), an electric vehicle (EV), etc. in which the battery 70 can be charged with the electric power by an outside electric power source. The vehicle 60 includes at least one electric motor. The electric motor is driven by the electric power stored in the battery 70. The vehicle 60 is driven by driving force generated by the electric motor. A charge inlet 80 is provided in the vehicle 60. A charge connector 14 of the battery charge equipment 11 is electrically connected to the charge inlet 80 to charge the battery 70 with the electric power supplied from the outside electric power source.

The battery charge equipment 11 includes an equipment body 12 and a charge arm 13. The equipment body 12 is an electric power source which supplies the electric power. The charge arm 13 has a function as an electric charge cable that the electric power passes through. Further, the charge arm 13 is provided with the charge connector 14 at one end of the charge arm 13. As described above, the charge connector 14 is to be electrically connected to the charge inlet 80 of the vehicle 60. The charge arm 13 is electrically connected to the equipment body 12 at the other end of the charge arm 13.

The embodiment charge system includes an ECU 90 or an electronic control unit 90. The ECU 90 includes a microcomputer as a main component. The microcomputer includes a CPU, a ROM, a RAM, a non-volatile memory, an interface, etc. The CPU realizes various functions by executing instructions, programs, and routines stored in the ROM.

The battery charge equipment 11 includes an inverter 15. The inverter 15 is used to control an amount of the electric power supplied to the battery 70 connected to the charge connector 14 via the charge inlet 80 of the vehicle 60. The inverter 15 is electrically connected to the ECU 90. The ECU 90 controls an activation of the inverter 15 to supply the electric power having a predetermined voltage Vconst to the battery 70 via the charge inlet 80 to which the charge connector 14 is electrically connected.

Further, the equipment body 12 includes a charge request switch 16. The charge request switch 16 is operated by a user of the vehicle 60 parked in the parking facility 10. The user can request the battery charge equipment 11 to electrically charge the battery 70 of the vehicle 60 by operating the charge request switch 16.

The charge request switch 16 is electrically connected to the ECU 90. The charge request switch 16 sends a signal to the ECU 90 to inform the ECU 90 of the charge request switch 16 being operated by the user. The ECU 90 realizes the vehicle 60 having the battery 70 requested to be electrically charged, based on the signal sent from the charge request switch 16.

Further, the battery charge equipment 11 includes various sensors 17. For example, the sensors 17 detect a voltage V and a current I of the electric power supplied to the battery 70 from the battery charge equipment 11.

The sensors 17 are electrically connected to the ECU 90. The sensors 17 send signals representing the detected voltage V and the detected current I to the ECU 90. The ECU 90 acquires the voltage V and the current I of the electric power now supplied to the battery 70 from the battery charge equipment 11, based on the signals sent from the sensors 17. In addition, the ECU 90 acquires a charge speed Vchg, a charge rate SOC, etc. of the battery 70 to which the electric power is supplied from the battery charge equipment 11, based on, the acquired voltage V and the acquired current I.

The charge speed Vchg is an amount of the electric power charged to the battery 70 from the battery charge equipment 11 per unit time. The charge rate SOC is percentage of a charge amount Pchg of the battery 70 relative to an upper charge amount limit Pmax of the battery 70, The charge amount Pchg is an amount of the electric, power stored in the battery 70. The upper charge amount limit Pmax is the amount of the electric power which can be maximally stored in the battery 70.

Figure 3A:
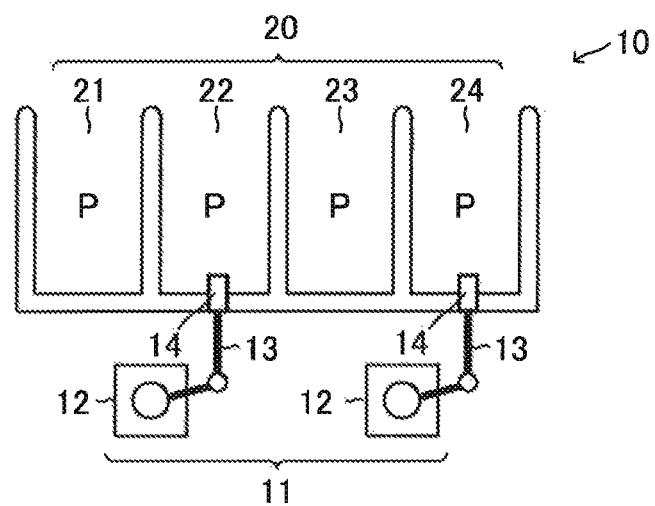
FIG. 3A is a view for showing an example of the battery charge equipment of the vehicle-installed battery charge system.

The battery charge equipment 11 may be configured as shown in FIG. 3A. The battery charge equipment 11 shown in FIG. 3A includes two equipment bodies 12 each, provided with one charge arm 13. In other words, the embodiment charge system may be applied to the battery charge equipment 11 provided with two or more equipment bodies 12 each provided with one charge arm 13. Similarly, the embodiment charge system may be applied to the battery charge equipment 11 provided with two or more equipment bodies 12 each provided with two or more charge arms 13.

Figure 3B:
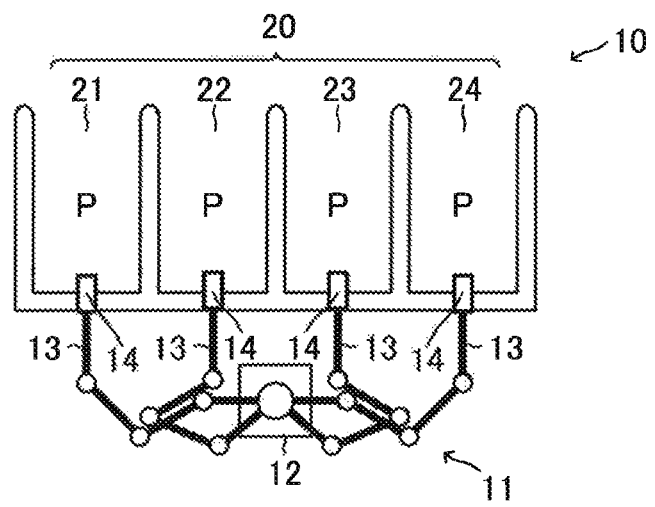
FIG. 3B is a view for showing another example of the battery charge equipment of the vehicle-installed battery charge system.

Further, the battery charge equipment 11 of the embodiment charge system may be configured as shown in FIG. 3B. The battery charge equipment 11 shown in FIG. 3B includes one equipment body 12 each provided with four charge arms 13. In other words, the embodiment charge system may be applied to the battery charge equipment 11 provided with one equipment body 12 provided with two or more charge arms 13.

Figure 4A:
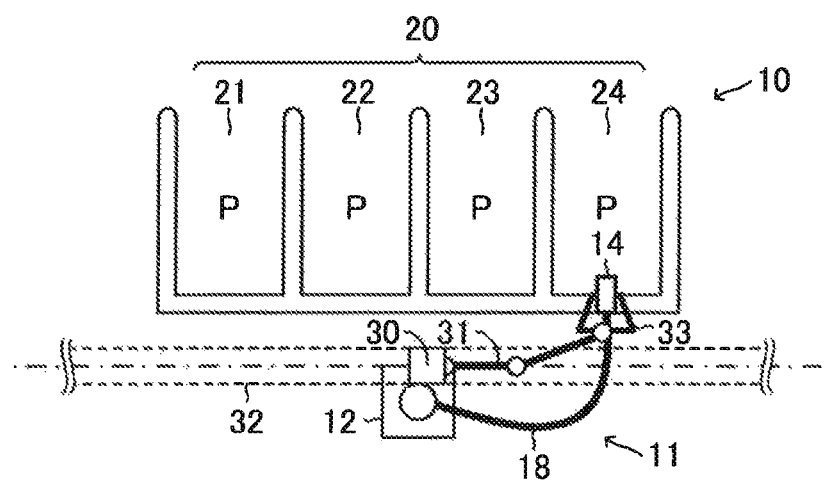
FIG. 4A is a view for showing further another example of the battery charge equipment of the vehicle-installed battery charge system, viewing the parking facility provided with the vehicle-installed battery charge system of this example from the above.
Figure 4B:
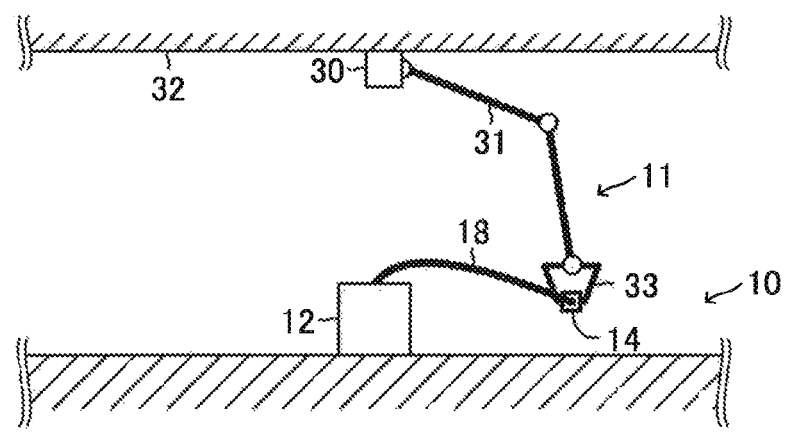
FIG. 4B is a view for showing the vehicle-installed battery charge system shown in FIG. 4A viewing from above.

Further, the battery charge equipment 11 may be configured as shown in FIG. 4, The battery charge equipment 11 shown in FIG. 4 includes one equipment body 12, one charge cable 18, one automated connection arm control apparatus 30, one automated connection arm 31, and a rail 32.

The charge cable 18 is provided with the charge connector 14. The charge connector 14 is mounted on one end of the charge cable 18. The charge cable 18 is electrically connected to the equipment body 12 as the electric power source at the other end of the charge cable 18.

The rail 32 is provided in the parking facility 10. The automated connection arm control apparatus 30 can move on the rail 32. The automated connection arm 31 is connected to the automated connection arm control apparatus 30 at an end of the automated connection arm 31. The automated connection arm 31 includes an automated connection hand 33. The automated connection hand 33 is mounted on the other end of the automated connection arm 31.

The automated connection arm control apparatus 30 can, electrically connects the charge connector 14 to the charge inlet 80 of the vehicle 60 by controlling motions of the automated connection arm 31 and the automated connection hand 33 while the automated connection arm control apparatus 30 moves on the rail 32, depending on necessity. Therefore, the rail 32 is installed in the parking facility 10 such that the automated connection arm control apparatus 30 can electrically connect the charge connector 14 to the charge inlet 80 of each of the vehicles 60 parked in the parking spaces 20.

Figure 5:
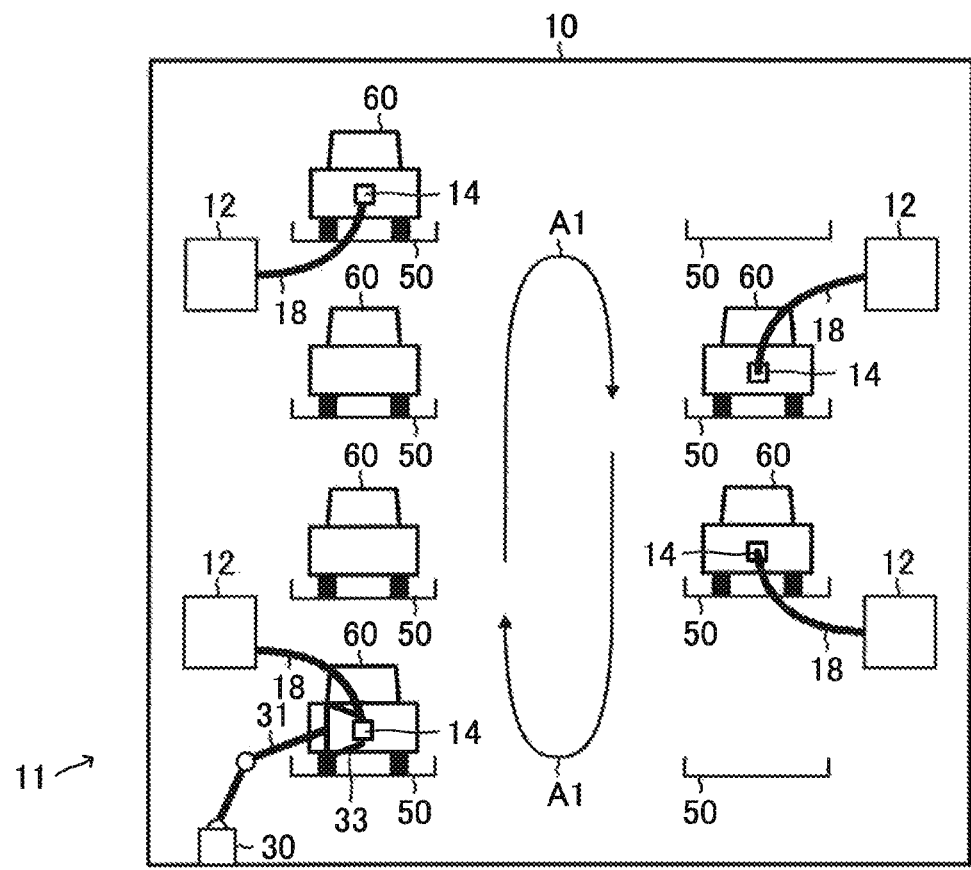
FIG. 5 is a view for showing further another example of the battery charge equipment of the vehicle-installed battery charge system.

Further, the battery charge equipment 11 may be configured as shown in FIG. 5. The battery charge equipment 11 shown in FIG. 5 is installed in a multilevel type of the parking facility 10. The parking facility 10 shown in FIG. 5 includes eight pallets 50. Each vehicle 60 is parked on each pallet 50. Therefore, the parking facility 10 shown in FIG. 5 includes eight parking spaces 20, The pallets 50 are provided such that the pallets 50 can be moved rotationally as shown in FIG. 5 by an arrow A1.

The battery charge equipment 11 shown in FIG. 5 includes four equipment bodies 12, four charge cables 18, one automated connection arm control apparatus 30, and one automated connection arm 31.

One equipment body 12 is provided every two pallets 50. One charge cable 18 is electrically connected to each equipment body 12. Each charge cable 18 includes one charge connector 14. The charge connector 14 is mounted on the end of the charge cable 18. Each charge cable 18 is electrically connected to the respective equipment body 12 as the outside electric power source at the other end of the charge cable 18.

The automated connection arm control apparatus 30 is installed on a floor 19 in the parking facility 10. The automated connection arm 31 is connected to the automated connection arm control apparatus 30 at an end of the automated connection arm 31. The automated connection arm 31 is provided with the automated connection hand 33, The automated connection hand 33 is mounted on the other end of the automated connection arm 31.

The automated connection arm control apparatus 30 can electrically connect the charge connector 14 coming around the automated connection arm control apparatus 30 to the charge inlet 80 of the vehicle 60 parked on the pallet 50 coming around the automated connection arm control apparatus 30 by controlling the motions of the automated connection arm 31 and the automated connection hand 33.

Each of the battery charge equipment 11 shown in FIGS. 1, 3A, 38, 4A, and 5 can electrically charge the number of the batteries 70 less than the number of the parking, spaces 20 at the same time.

<Summary of Operation of Embodiment Charge System>

Next, a summary of an operation of the embodiment charge system will be described, Below, the summary of the operation of the embodiment charge system will be described, using an example that three vehicles 60 are parked as shown in FIG. 6 in the first, second, and third parking spaces 21, 22, and 23 of the parking facility 10 (see FIG. 1).

In this example used for describing the summary of the operation of the embodiment charge system, the first vehicle 61 is first parked in the first parking space 21. After the first vehicle 61 is parked in the first parking space 21, the second vehicle 62 is parked in the second parking space 22. After the second vehicle 62 is parked in the second parking space 22, the third vehicle 63 is parked in the third parking space 23. Further, in this example, the user of the first vehicle 61 first operates the charge request switch 16 to request the embodiment charge system to electrically charge the battery 70 of the first vehicle 61. After the user of the first vehicle 61 requests the embodiment charge system to electrically charge the battery 70 of the first vehicle 61, the user of the second vehicle 62 operates the charge request switch 16 to request the embodiment charge system to electrically charge the battery 70 of the second vehicle 62. After the user of the second vehicle 62 requests the embodiment charge system to electrically charge the battery 70 of the second vehicle 62, the user of the third vehicle 63 operates the charge request switch 16 to request the embodiment charge system to electrically charge the battery 70 of the third vehicle 63.

For simplifying description of the summary of the operation of the embodiment control system, it is assumed that the order of electrically charging the batteries 70 of the vehicles 61, 62, and 63 is not changed. In other words, the first vehicle 61 is charged first with the electric power, then the second vehicle 62 is charged with the electric power, and then the third vehicle 63 is charged with the electric power.

Figure 6A:
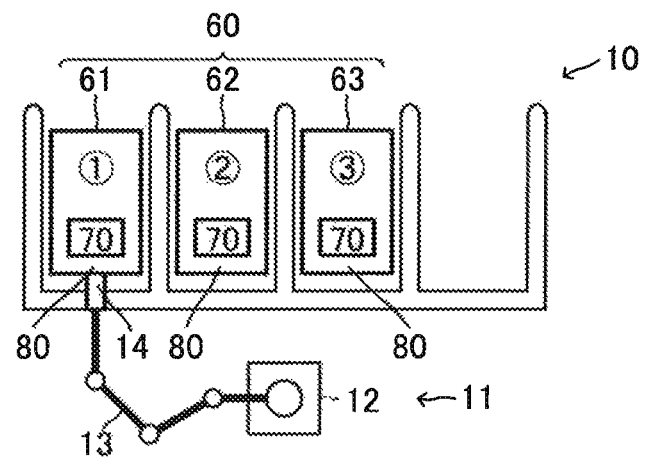
FIG. 6A is a view for showing the vehicle-installed battery charge system shown in FIG. 1 which is electrically charging a battery of the vehicle scheduled to be electrically charged first.
Figure 7:
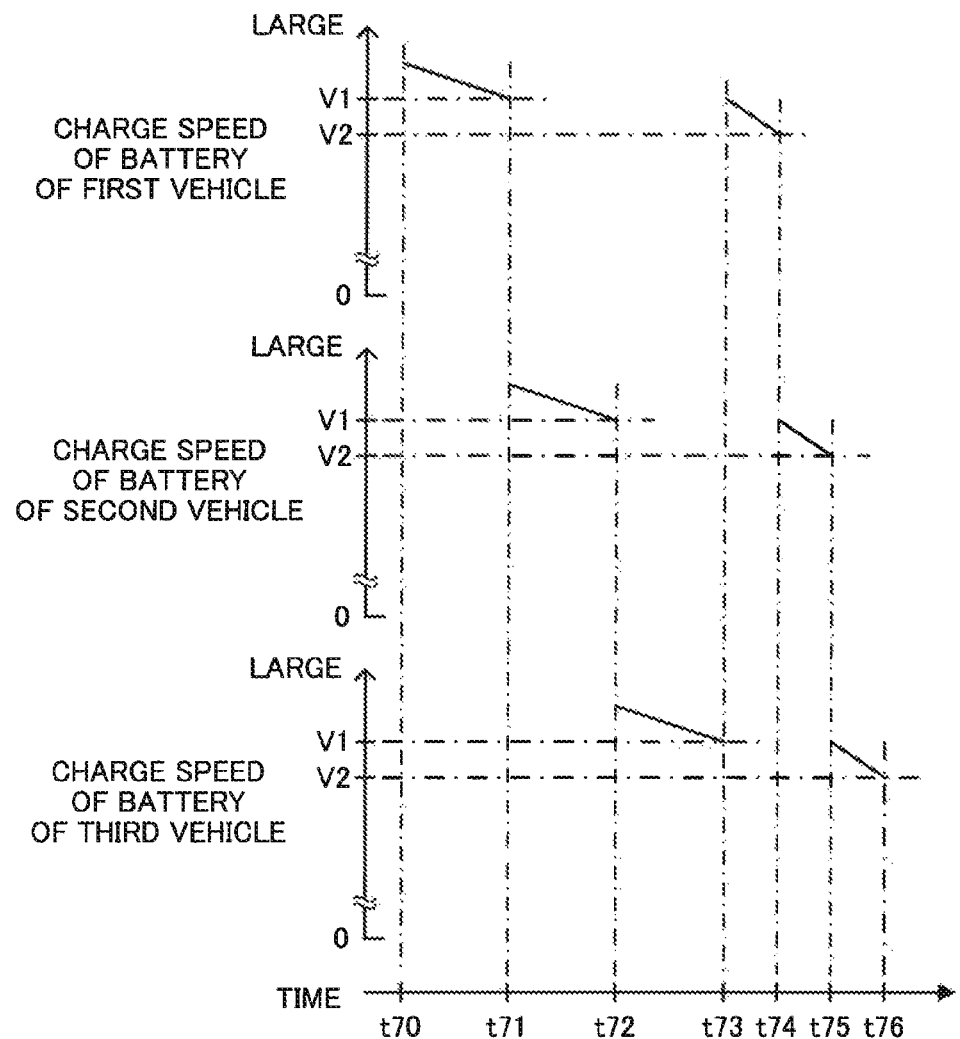
FIG. 7 is a view for showing, a time chart used for describing an operation of the vehicle-installed battery charge system shown in FIG. 1.

As shown in FIG. 6A, the embodiment charge system connects the charge connector 14 to the charge inlet 80 of the first vehicle 61 which is first requested to be electrically charged and starts an execution of a process to electrically charge the battery 70 of the first vehicle 61 (see a point of time t70 in FIG. 7). The embodiment charge system acquires the charge speed Vchg of the battery 70 of the first vehicle 61 while the embodiment charge system executes the process to electrically charge the battery 70 of the first vehicle 61.

The embodiment charge system continues to execute the process to electrically charge the battery 70 of the first vehicle 61 until the charge speed Vchg of the battery 70 of the first vehicle 61 decreases to a predetermined charge speed threshold Vth. At the moment, the embodiment charge system uses a predetermined threshold V1 as the predetermined charge speed threshold Vth. The predetermined, threshold V1 is set to a relatively large value. Hereinafter, the predetermined threshold V1 will be referred to as "the first threshold V1".

When the charge speed Vchg of the battery 70 of the first vehicle 61 decreases to the first threshold V1 (see a point of time t71), the embodiment charge system disconnects the charge connector 14 from the charge inlet 80 of the first vehicle 61. At this moment, the embodiment charge system memorizes the charge rate SOC of the battery 70 of the first vehicle 61.

Figure 6B:
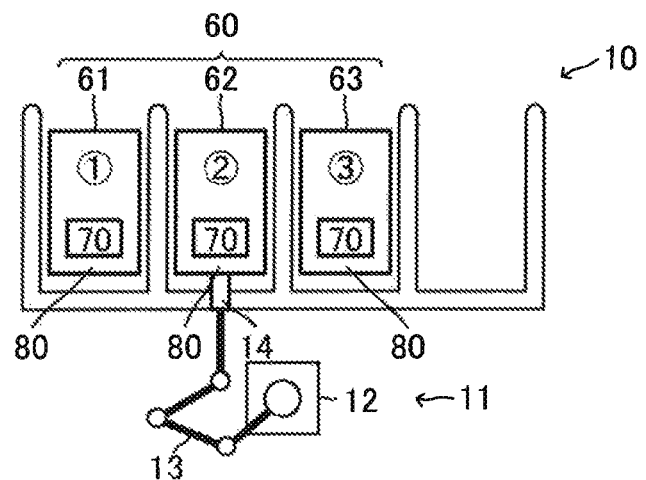
FIG. 6B is a view for showing the vehicle-installed battery charge system shown in FIG. 1 which is electrically charging the battery of the vehicle scheduled to be electrically charged second.

Next, as shown in FIG. 6B, the embodiment charge system connects the charge connector 14 disconnected from the charge inlet 80 of the first vehicle 61 to the charge inlet 80 of the second vehicle 62 which is requested, to be electrically charged after the battery 70 of the first vehicle 61 is requested to be electrically charged and starts the execution of the process to electrically charge the battery 70 of the second vehicle 62 (see the point of time t71 in FIG. 7). The embodiment charge system acquires the charge speed Vchg of the battery 70 of the second vehicle 62 while the embodiment charge system executes the process to electrically charge the battery 70 of the second vehicle 62.

The embodiment charge system continues to execute the process to electrically charge the battery 70 of the second vehicle 62 until the charge speed Vchg of the battery 70 of the second vehicle 62 decreases to the predetermined charge speed threshold Vth. At the moment, the embodiment charge system also uses the first threshold V1 as the predetermined charge speed threshold Vth.

When the charge speed Vchg of the battery 70 of the second vehicle 62 decreases to the first threshold V1 (see a point of time t72), the embodiment charge system disconnects the charge connector 14 from the charge inlet 80 of the second vehicle 62. At this moment, the embodiment charge system memorizes the charge rate SOC of the battery 70 of the second vehicle 62.

Figure 6C:
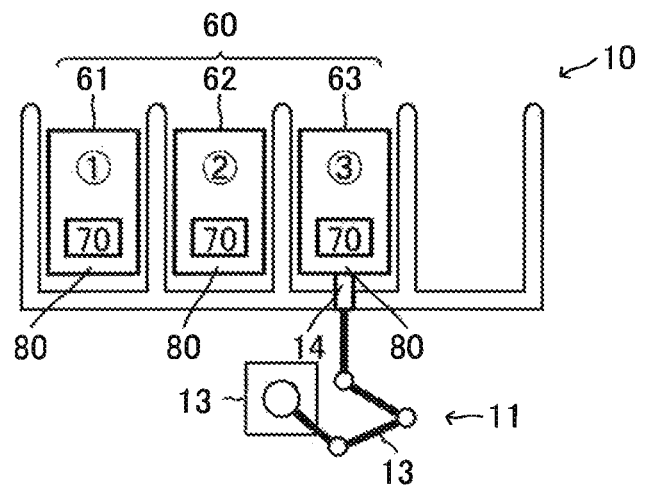
FIG. 6C is a view for showing the vehicle-installed battery charge system shown in FIG. 1 which is electrically charging the battery of the vehicle scheduled to be electrically charged third.

Next, as shown in FIG. 6C, the embodiment charge system connects the charge connector 14 disconnected from the charge inlet 80 of the second vehicle 62 to the charge inlet 80 of the third vehicle 63 which is requested to be electrically charged after the second vehicle 62 is requested to be electrically charged and starts the execution of the process to electrically charge the battery 70 of the third vehicle 63 (see the point of time t72 in FIG. 7). The embodiment charge system acquires the charge speed Vchg of the battery 70 of the third vehicle 63 while the embodiment charge system executes the process to electrically charge the battery 70 of the third vehicle 63.

The embodiment charge system continues to execute the process to electrically charge the battery 70 of the third vehicle 63 until the charge speed Vchg of the battery 70 of the third vehicle 63 decreases to the predetermined charge speed threshold Vth. At the moment, the embodiment charge system also uses the first threshold V1 as the predetermined charge speed threshold Vth.

When the charge speed Vchg of the battery 70 of the third vehicle 63 decreases to the first threshold V1 (see a point of time t73), the embodiment charge system disconnects the charge connector 14 from the charge inlet 80 of the third vehicle 63. At this moment, the embodiment charge system memorizes the charge rate SOC of the battery 70 of the third vehicle 63.

When the embodiment charge system ends the executions of the processes to electrically charge the batteries 70 of all vehicles 61, 62, and 63 requested to be electrically charged, the embodiment charge system determines whether the charge rate SOC of the battery 70 of the first vehicle 61 reaches an upper charge rate limit SOCmax.

When the charge rate SOC of the battery 70 of the first vehicle 61 does not reach the upper charge rate limit SOCmax, the embodiment charge system connects the charge connector 14 disconnected from the charge inlet 80 of the third vehicle 63 to the charge inlet 80 of the first vehicle 61 as shown in FIG. 6A and starts the execution of the process to electrically charge the battery 70 of the first vehicle 61 (see the point of time t73 in FIG. 7). The embodiment charge system acquires the charge speed Vchg of the battery 70 of the first vehicle 61 while the embodiment charge system executes the process to electrically charge the battery 70 of the first vehicle 61.

The embodiment charge system continues to execute the process to electrically charge the battery 70 of the first vehicle 61 until the charge speed Vchg of the battery 70 of the first vehicle 61 decreases to the predetermined charge speed threshold Vth. At the moment, the embodiment charge system uses a predetermined threshold V2 as the predetermined charge speed threshold Vth. The predetermined threshold V2 is set to a value smaller than the first threshold V1. Hereinafter, the predetermined threshold V2 will be referred to as "the second threshold V2".

When the charge speed Vchg of the battery 70 of the first vehicle 61 decreases to the second threshold V2 (see a point of time t74), the embodiment charge system disconnects the charge connector 14 from the charge inlet 80 of the first vehicle 61. At this moment, the embodiment charge system memorizes the charge rate SOC of the battery 70 of the first vehicle 61.

Next, the embodiment charge system determines whether the charge rate SOC of the battery 70 of the second vehicle 62 reaches the upper charge rate limit SOCmax.

It should be noted that the embodiment charge system does not execute the process to electrically charge the battery 70 of the first vehicle 61 and determines whether the charge rate SOC of the battery 70 of the second vehicle 62 reaches the upper charge rate limit SOCmax when the embodiment charge system determines that the charge rate SOC of the battery 70 of the first vehicle 61 reaches the upper charge rate limit SOCmax.

When the charge rate SOC of the battery 70 of the second vehicle 62 does not reach the upper charge rate limit SOCmax, the embodiment charge system connects the charge connector 14 disconnected from the charge inlet 80 of the first vehicle 61 to the charge inlet 80 of the second vehicle 62 as shown in FIG. 6B and starts the execution of the process to electrically charge the battery 70 of the second vehicle 62 (see the point of time t74 in FIG. 7). The embodiment charge system acquires the charge speed Vchg of the battery 70 of the second vehicle 62 while the embodiment charge system executes the process to electrically charge the battery 70 of the second vehicle 62.

The embodiment charge system continues to execute the process to electrically charge the battery 70 of the second vehicle 62 until the charge speed Vchg of the battery 70 of the second vehicle 62 decreases to the predetermined charge speed threshold Vth. At the moment, the embodiment charge system also uses the second threshold V2 as the predetermined charge speed threshold Vth.

When the charge speed Vchg of the battery 70 of the second vehicle 62 decreases to the second threshold V2 (see a point of time t75), the embodiment charge system disconnects the charge connector 14 from the charge inlet 80 of the second vehicle 62. At this moment, the embodiment charge system memorizes the charge rate SOC of the battery 70 of the second vehicle 62.

Next, the embodiment charge system determines whether the charge rate SOC of the battery 70 of the third vehicle 63 reaches the upper charge rate limit SOCmax.

It should be noted that the embodiment charge system does not execute the process to electrically charge the battery 70 of the second vehicle 62 and determines whether the charge rate SOC of the battery 70 of the third vehicle 63 reaches the upper charge rate limit SOCmax when the embodiment charge system determines that the charge rate SOC of the battery 70 of the second vehicle 62 reaches the upper charge rate limit SOCmax.

When the charge rate SOC of the battery 70 of the third vehicle 63 does not reach the upper charge rate limit SOCmax, the embodiment charge system connects the charge connector 14 disconnected from the charge inlet 80 of the second vehicle 62 to the charge inlet 80 of the third vehicle 63 as shown in FIG. 6C and starts the execution of the process to electrically charge the battery 70 of the third vehicle 63 (see the point of time t75 in FIG. 7). The embodiment charge system acquires the charge speed Vchg of the battery 70 of the third vehicle 63 while the embodiment charge system executes the process to electrically charge the battery 70 of the third vehicle 63.

The embodiment charge system continues to execute the process to electrically charge the battery 70 of the third vehicle 63 until the charge speed Vchg of the battery 70 of the third vehicle 63 decreases to the predetermined charge speed threshold Vth. At the moment, the embodiment charge system also uses the second threshold V2 as the predetermined charge speed threshold Vth.

When the charge speed Vchg of the battery 70 of the third vehicle 63 decreases to the second threshold V2 (see a point of time t76), the embodiment charge system disconnects the charge connector 14 from the charge inlet 80 of the third vehicle 63. At this moment, the embodiment charge system memorizes the charge rate SOC of the battery 70 of the third vehicle 63.

Thereafter, the embodiment charge system executes the processes to electrically charge the batteries 70 of the vehicles 60 (in this example, the first to third vehicles 61 to 63) requested to be electrically charged in accordance with the predetermined charge order until the charge rates SOC of the batteries 70 of the vehicles 60 reach the upper charge rate limit SOCmax, respectively with decreasing the predetermined charge speed threshold Vth each time the processes to electrically charge all batteries 70 to be electrically charged are ended.

Figure 8:
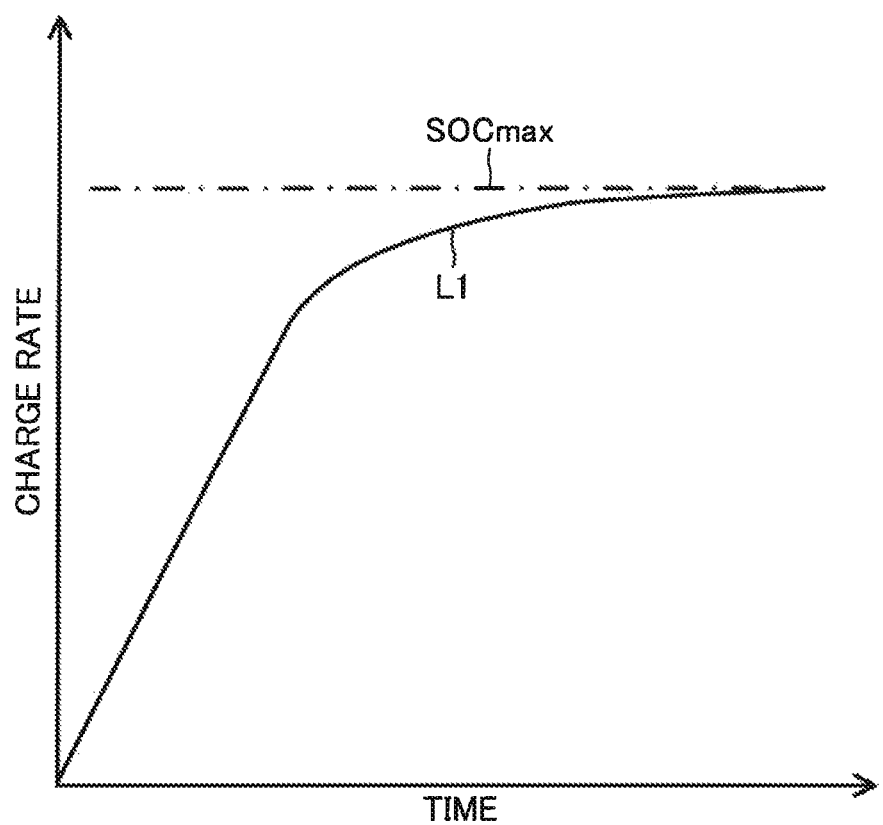
FIG. 8 is a view for showing a change of a charge rate of the battery while the battery is electrically charged.

As shown in FIG. 8, the charge rate SOC increases with time while the battery 70 is electrically charged. When the charge rate SOC increases, the charge speed Vchg decreases. In FIG. 8, an inclination of a curved line L1 showing the charge rate SOC corresponds to the charge speed Vchg.

On the other hand, the embodiment charge system ends the execution of the process to electrically charge the battery 70 now charged and starts the execution of the process to electrically charge the battery 70 scheduled to be charged next when the charge speed Vchg of the battery 70 now charged decreases to the predetermined charge speed threshold Vth, Thus, the batteries 70 can be electrically charged with the charge speed Vchg of each battery 70 being maintained at the high charge speed. Therefore, each battery 70 can be charged with the large amount of the electric power for a certain constant time.

<Setting Order to Charge>

Figure 9:
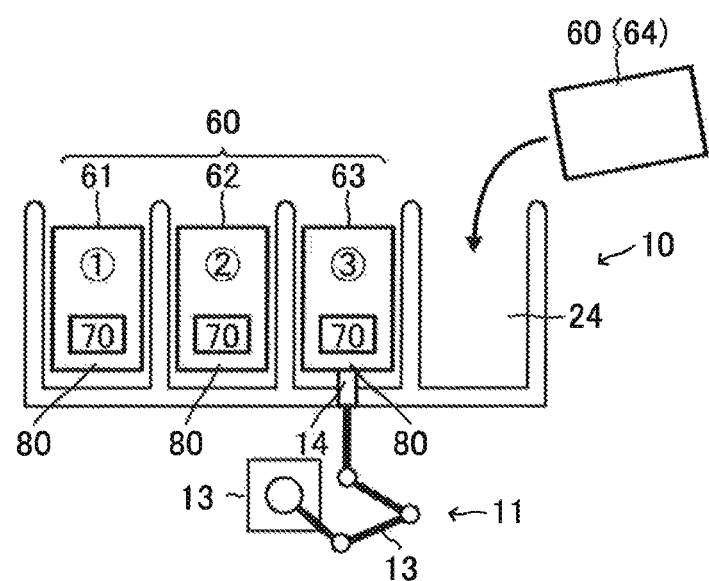
FIG. 9 is a view for showing the vehicle-installed battery charge system shown in FIG. 1 in which the vehicle is newly parked in the parking space while the battery of the other vehicle already parked is being electrically charged.

As shown in FIG. 9, the vehicle 60 may be newly parked in the parking space 20 in which no vehicle 60 has been parked, in this example, the fourth parking space 24, and the battery 70 of the newly-parked vehicle 60 becoming the fourth vehicle 64 may be requested to be electrically charged while the battery 70 of the third vehicle 63 is being electrically charged. In this case, the embodiment charge system determines to execute the process to electrically charge the battery 70 of the fourth vehicle 64 next to the execution of the process to electrically charge the battery 70 of the third vehicle 63.

Further, the embodiment charge system sets the order of executing the processes to electrically charge the batteries 70 requested to be electrically charged such that the process to electrically charge the battery 70 requested to be electrically charged at an earlier point of time is executed early. In this regard, the embodiment charge system may be configured to set the order of executing the processes to electrically charge the batteries 70 requested to be electrically charged such that the process to electrically charge the battery 70 of the vehicle 60rsv which has been reserved to be electrically charged in advance is executed early.

Alternatively, the embodiment charge system may be configured to set the order of executing the processes electrically charge the batteries 70 of the vehicles 60 in decreasing order of a remaining chargeable amount Prem of each battery 70. The remaining chargeable amount Prem of the battery 70 is an amount of the electric power which can be charged to the battery 70 at a present point of time. In particular, the remaining chargeable amount Prem of the battery 70 is a difference of the present charge amount Pchg relative to the upper charge amount limit Pmax.

Further, the embodiment charge system may be configured to set the order of executing the processes to electrically charge the batteries 70 of the vehicles 60 in decreasing order of a remaining charge rate SOCrem of each battery 70. The remaining charge rate SOCrem of the battery is a difference of the present charge rate SOC relative to the upper charge rate limit SOCmax.

If the embodiment charge system is configured to acquire data on planned movement distances Dtravel of the vehicles 60, the embodiment charge system may be configured to set the order of executing the processes to electrically charge the batteries 70 of the vehicles 60 in decreasing order of the planned movement distance Dtravel of the vehicle 60. The planned movement distance Dtravel is a distance that the vehicle 60 plans to move after the vehicle 60 goes out of the parking facility 10.

Further, if the embodiment charge system is configured to acquire data on planned payment amounts of the users of the vehicles 60, the embodiment charge system may be configured to set the order of executing the processes to electrically charge the batteries 70 of the vehicles 60 in decreasing order of the planned payment amount of the user. The planned payment amount is an amount of money that the user plans to pay for electrically charging the battery 70 of the vehicle 60.

<Setting of Charge End Threshold>

As described above, the embodiment charge system uses the charge speed Vchg as an index for determining whether the embodiment charge system ends the execution of the process to electrically charge the battery 70 now charged. Hereinafter; the vehicle 60 having the battery 70 now charged will be referred to as "the now-charged vehicle 60now".

In this regard, the embodiment charge system may be configured to use the index correlating with the charge speed Vchg as the index for determining whether the embodiment charge system ends the execution of the process to electrically charge the battery 70 of the now-charged vehicle 60now. Hereinafter; the index correlating with the charge speed Vchg will be referred to as "the charge speed correlation value".

For example, the embodiment charge system may be configured to use a charge speed difference dVchg as the charge speed correlation value. The charge speed difference dVchg is a difference of the charge speed Vchg_now of the battery 70 of the now-charged vehicle 60now relative to the charge speed Vchg_next of the battery 70 of the next-charged vehicle 60next (dVchg=Vchg_next Vchg_now). The next-charged vehicle 60next is the vehicle 60 having the battery 70 scheduled to be electrically charged next to the battery 70 now charged. In this case, the embodiment charge system is configured to end the execution of the process to electrically charge the battery 70 of the now-charged vehicle 60now when the charge speed difference dVchg becomes equal to or greater than a predetermined charge speed difference threshold dVchg_th.

Further; the embodiment charge system may be configured to use an output electric power amount Pout of the battery charge equipment 11 as the charge speed correlation value. The output electric power amount Pout of the battery charge equipment 11 is an amount of the electric power currently output from the battery charge equipment 11 to the battery 70 of the now-charged vehicle 60now. In this case, the embodiment charge system is configured to end the execution of the process to electrically charge the battery 70 of the now-charged vehicle 60now when the output electric power amount Pout becomes equal to or smaller than a predetermined output electric power amount threshold. Pout_th.

Further; the embodiment charge system may be configured to use an output electric power amount difference dPout of the battery charge equipment 11 as the charge speed correlation value. The output electric power amount difference dPout is a difference of the current output electric power amount Pout_now of the battery charge equipment 11 relative to an estimated output electric power amount Pout_est (dPout=Pout_est−Pout_now). The estimated output electric power amount Pout_est is the output electric power amount Pout estimated to be output from the battery charge equipment 11 while the battery 70 of the next-charged vehicle 60next is electrically charged. In this case, the embodiment charge system is configured to end the execution of the process to electrically charge the battery 70 of the now-charged vehicle 60now when the output electric power amount difference dPout becomes equal to or greater than a predetermined output electric power amount difference threshold dPout_th.

Further, the embodiment charge system may be configured to use an estimated charge-end time Tend as the charge speed correlation value. The estimated charge-end time Tend is a time estimated to be required for the charge amount Pchg of the battery 70 of the now-charged vehicle 60now to reach a target charge amount Pchg_tgt by the process to electrically charge the battery 70 of the now-charged vehicle 60now. In this case, the embodiment charge system is configured to end the execution of the process to electrically charge the battery 70 of the now-charged vehicle 60now when the estimated charge-end time Tend of the battery 70 of the now-charged vehicle 60now becomes equal to or greater than a predetermined estimated charge-end time threshold Tend_th.

Further, the embodiment charge system may be configured to use an estimated charge-end time difference dTend as the charge speed correlation value. The estimated charge-end time difference dTend is a difference of the estimated charge-end time Tend_next of the battery 70 of the next-charged vehicle 60next relative to the estimated charge-end time Tend_now of the battery 70 of the now-charged vehicle 60now (dTend=Tend_now−Tend_next). The estimated charge-end time Tend_next is the estimated charge-end time Tend estimated for the charge amount Pchg of the battery 70 of the next-charged vehicle 60next to reach the target charge amount Pchg_tgt when the battery 70 of the next-charged vehicle 60next is electrically charged. In this case, the embodiment charge system is configured to end the execution of the process to electrically charge the battery 70 of the now-charged vehicle 60now when the estimated charge-end time difference dTend becomes equal to or greater than a predetermined estimated charge-end time difference threshold dTend_th.

Further, the embodiment charge system may be configured to use the charge amount Pchg of the battery 70 of the now-charged vehicle 60now as the charge speed correlation value, n this case, the embodiment charge system is configured to end the execution of the process to electrically charge the battery 70 of the now-charged vehicle 60now when the charge amount Pchg of the battery 70 of the now-charged vehicle 60now becomes equal to or greater than a predetermined charge amount threshold. Pchg_th.

Further, the embodiment charge system may use a battery charge amount difference dPchg as the charge speed correlation value. The battery charge amount difference dPchg is a difference of the charge amount Pchg_next of the battery 70 of the next-charged vehicle 60next relative to the charge amount Pchg_now of the battery 70 of the now-charged vehicle 60now (dPchg=Pchg_now−Pchg_next). In this case, the embodiment charge system is configured to end the execution of the process to electrically charge the battery 70 of the now-charged vehicle 60now when the battery charge amount difference dPchg becomes equal to or greater than a predetermined battery charge amount difference threshold dPchg_th.

Further, the embodiment charge system may be configured to use the charge rate SOC of the battery 70 of the now-charged vehicle 60now as the charge speed correlation value. In this case, the embodiment charge system is configured to end the execution of the process to electrically charge the battery 70 of the now-charged vehicle 60now when the charge rate SOC of the battery 70 of the now-charged vehicle 60now becomes equal to or greater than a predetermined charge rate threshold SOCth.

Further, the embodiment charge system may use a charge rate difference dSOC as the charge speed correlation value. The charge rate difference dSOC is a difference of the charge rate SOCnext of the battery 70 of the next-charged vehicle 60next relative to the charge rate SOCnow of the battery 70 of the now-charged vehicle 60now (dSOC=SOCnow−SOCnext). In this case, the embodiment charge system is configured to end the execution of the process to electrically charge the battery 70 of the now-charged vehicle 60now when the charge rate difference dSOC becomes equal to or greater than a predetermined charge rate difference threshold dSOCth.

Further, the embodiment charge system may be configured to use the remaining chargeable amount Prem of the battery 70 of the now-charged vehicle 60now as the charge speed correlation value. The remaining chargeable amount Prem is a difference of the charge amount. Pchg of the battery 70 of the now-charged vehicle 60now relative to the upper chargeable amount limit Pmax of the battery 70 of the now-charged vehicle 60now (Prem=Pmax−Pchg). In this case, the embodiment charge system is configured to end the execution of the process to electrically charge the battery 70 of the now-charged vehicle 60now when the remaining chargeable amount Prem of the battery 70 of the now-charged vehicle 60now becomes equal to or smaller than a predetermined remaining chargeable amount threshold Prem_th.

Further, the embodiment charge system may be configured to use a remaining chargeable amount difference dPrem as the charge speed correlation value. The remaining chargeable amount difference dPrem is a difference of the remaining chargeable amount Prem_now of the battery 70 of the now-charged vehicle 60now relative to the remaining chargeable amount Prem_next of the battery 70 of the next-charged vehicle 60next (dPrem=Prem_next−Prem_now) In this case, the embodiment charge system is configured to end the execution of the process to electrically charge the battery 70 of the now-charged vehicle 60now when the remaining chargeable amount difference dPrem becomes equal to or greater than a predetermined remaining chargeable, amount difference threshold dPrem_th.

Further, the embodiment charge system may be configured to use a temperature That of the battery 70 of the now-charged vehicle 60now as the charge speed correlation value. In this case, the embodiment charge system is configured to end the execution of the process to electrically charge the battery 70 of the now-charged vehicle 60now when the temperature Tbat of the battery 70 of the now-charged vehicle 60now becomes equal to or higher than a predetermined temperature threshold Tbat_th.

Further, the embodiment charge system may use a battery temperature difference dTbat as the charge speed correlation value. The battery temperature difference dTbat is a difference of the temperature Tbat_next of the battery 70 of the next-charged vehicle 60next relative to the temperature Tbat_now of the battery 70 of the now-charged vehicle 60now (dTbat=Tbat_now−Tbat_next). In this case, the embodiment charge system is configured to end the execution of the process to electrically charge the battery 70 of the now-charged vehicle 60now when the battery temperature difference dTbat becomes equal to or greater than a predetermined battery temperature difference threshold dTbat_th.

Further, the embodiment charge system may be configured to use a requested cooling amount CL of the battery 70 of the now-charged vehicle 60now as the charge speed correlation value. The requested cooling amount CL is an index representing a degree of cooling the battery 70 requested to maintain the temperature Tbat of the battery 70 at a target temperature Tbat_tgt. For example, the requested cooling amount CL is a flow rate of cooling water to be supplied to the battery 70 to cool the battery 70. In this case, the embodiment charge system is configured to end the execution of the process to electrically charge the battery 70 of the now-charged vehicle 60now when the requested cooling amount CL of the battery 70 of the now-charged vehicle 60now becomes equal to or greater than a predetermined requested cooling amount threshold CLth.

Further, the embodiment charge system may be configured to use a requested cooling amount difference dCL as the charge speed correlation value. The requested cooling amount difference dCL is a difference of the requested cooling amount CLnext of the battery 70 of the next-charged vehicle 60next relative to the requested cooling amount CLnow of the battery 70 of the now-charged vehicle 60now (dCL=CLnow−CLnext), In this case, the embodiment charge system is configured to end the execution of the process to electrically charge the battery 70 of the now-charged vehicle 60now when the requested cooling amount difference dCL becomes equal to or greater than a predetermined requested cooling amount difference threshold dCLth.

The embodiment charge system is configured to charge the user money amount M for electrically charging the battery 70, depending on an amount of the electric power supplied from the battery charge equipment 11 to the battery 70. In particular, the embodiment charge system is configured to charge the user the much money amount M for electrically charging the battery 70 as the amount of the electric power supplied from the battery charge equipment 11 to the battery 70 increases.

In this regard, the embodiment charge system may be configured to charge the user the greater money amount M for electrically charging the battery 70 when the charge speed Vchg is high, compared with when the charge speed Vchg is low.

In this case, the embodiment charge system may be configured to use the money amount M for electrically charging the battery 70 of the now-charged vehicle 60now as the charge speed correlation value. In this case, the embodiment charge system is configured to end the execution of the process to electrically charge the battery 70 of the now-charged vehicle 60now when the money amount M for electrically charging the battery 70 of the now-charged vehicle 60now becomes equal to or greater than a predetermined money amount threshold Mth.

Further, the embodiment charge system may be configured to use a money amount difference dM as the charge speed correlation value. The money amount difference dM is a difference of the money amount Mnext for electrically charging the battery 70 of the next-charged vehicle 60next relative to the money amount Mnow for electrically charging the battery 70 of the now-charged vehicle 60now (dM=Mnow−Mnext). In this case, the embodiment charge system is configured to end the execution of the process to electrically charge the battery 70 of the now-charged vehicle 60now when the money amount difference dM becomes equal to or greater than a predetermined money amount difference threshold dMth.

<Concrete Operation of Embodiment Charge System>

Figure 10:
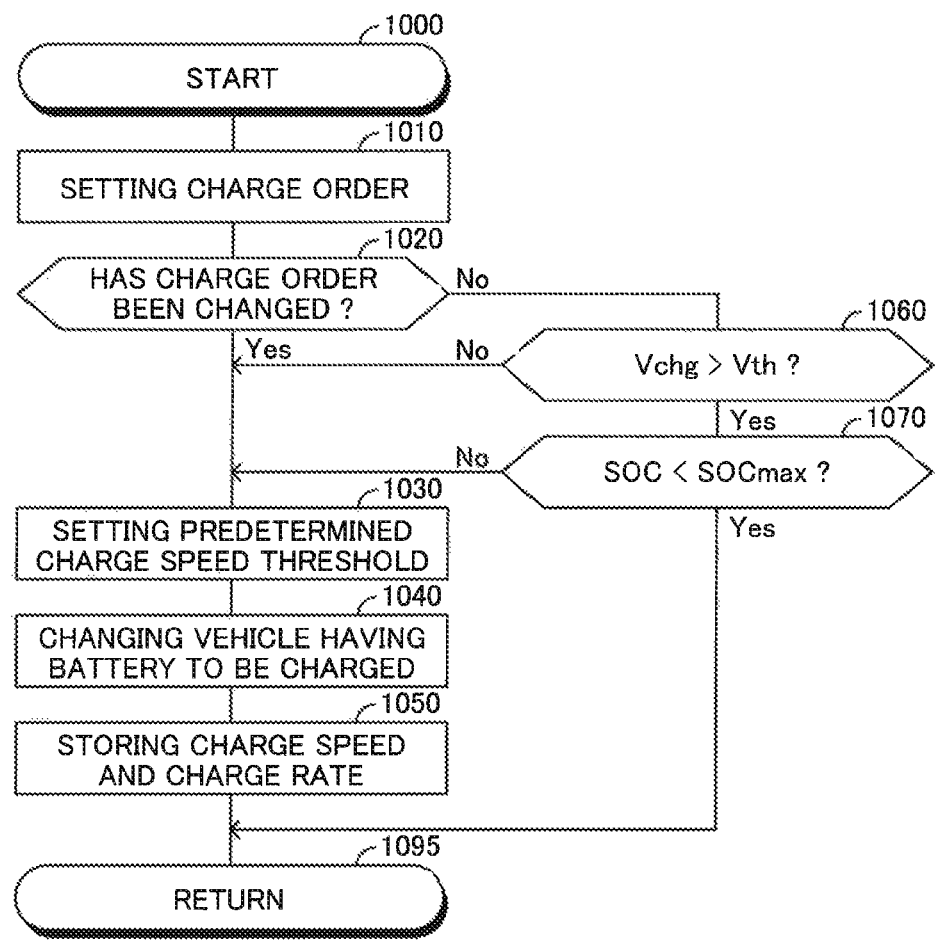
FIG. 10 is a view for showing a flowchart of a routine executed by a CPU of an ECU shown in FIG. 1.

Next, a concrete operation of the embodiment charge system will be described. The CPU of the ECU 90 of the embodiment charge system is configured or programmed to execute a routine shown by a flowchart in FIG. 10 with a predetermined time interval. Therefore, at a predetermined timing, the CPU starts a process from a step 1000 in FIG. 10 and executes a process of a step 1010 described below. Then, the CPU proceeds with the process to a step 1020.

Step 1010: The CPU sets the order of executing the processes to electrically charge the batteries 70 as described above. Hereinafter, the order of executing the process to electrically charge the batteries 70 will be referred to as "the charge order".

When the CPU proceeds with the process to the step 1020, the CPU determines whether the charge order has been changed at the step 1010. When the charge order has been changed at the step 1010, the CPU determines "Yes" at the step 1020 and then, sequentially executes processes of steps 1030 to 1050 described below. Then, the CPU proceeds with the process to a step 1095 to terminate this routine once.

Step 1030: The CPU sets the predetermined charge speed threshold Vth as described above.

Step 1040: The CPU disconnects the charge connector 14 from the charge inlet 80 of the now-charged vehicle 60now and connects the charge connector 14 to the charge inlet 80 of the next-charged vehicle 60next.

Step 1050: The CPU acquires data on the charge speed Vchg and the charge rate SOC of the battery 70 of the vehicle 60 having the charge inlet 80 from which the charge connector 14 is disconnected at the step 1040 and stores the acquired data in the RAM.

On the other hand, when the charge order has not been changed, the CPU determines "No" at the step 1020 and then, proceeds with the process to a step 1060 to determine whether the charge speed Vchg of the battery 70 of the now-charged vehicle 60now is greater than the predetermined charge speed threshold Vth.

When the charge speed Vchg of the battery 70 of the now-charged vehicle 60now is equal to or smaller than the predetermined charge speed threshold Vth, the CPU determines No at the step 1060 and then, sequentially executes the processes of the steps 1030 to 1050 described above. In this case, the batteries 70 to be electrically charged are changed. Then, the CPU proceeds with the process to the step 1095 to terminate this routine once.

On the other hand, when the charge speed Vchg of the battery 70 of the now-charged vehicle 60now is greater than the predetermined charge speed threshold Vth, the CPU determines "Yes" at the step 1060 and then, proceeds with the process to a step 1070 to determine whether the charge rate SOC of the battery 70 of the now-charged vehicle 60now is smaller than the upper charge rate limit SOCmax.

When the charge rate SOC of the battery 70 of the now-charged vehicle 60now is equal to or greater than the upper charge rate limit SOCmax, the CPU determines "No" at the step 1070 and then, sequentially executes the processes of the steps 1030 to 1050 described above. In this case, the batteries 70 to be electrically charged are changed. Then, the CPU proceeds with the process to the step 1095 to terminate this routine once.

On the other hand, when the charge rate SOC of the battery 70 of the now-charged vehicle 60now is smaller than the upper charge rate limit SOCmax, the CPU determines "Yes" at the step 1070 and then, proceeds with the process to the step 1095 directly to terminate this routine once. In this case, the execution of the process to electrically charge the battery 70 of the now-charged vehicle 60now is continued.

The concrete operation of the embodiment charge system has been described. When the embodiment charge system executes the routine shown in FIG. 10, and the charge speed Vchg decreases to a certain charge speed, the embodiment charge system ends the execution of the process to electrically charge the battery 70 of the now-charged vehicle 60now and starts the execution of the process to electrically charge the battery 70 of the next-charged vehicle 60next Thus, each battery 70 is electrically charged with the charge speed Vchg of the battery 70 being maintained at the high charge speed. As a result, each battery 70 can be charged with the large amount of the electric power for the constant time.

It should be noted that the present disclosure is not limited to the aforementioned embodiment and various modifications can be employed within the scope of the present disclosure.

For example, in the embodiment, the battery charge equipment 11 is installed in the parking facility 10. In this regard, the battery charge equipment 11 may be installed in any place where the vehicle 60 is parked for the purpose of electrically charging the battery 70.

What is claimed is:

1. A vehicle-installed battery charge system, comprising:
    a battery charge equipment for electrically charging batteries installed in vehicles; and
    an electronic control unit for controlling executions of processes to electrically charge the batteries, respectively by the battery charge equipment;
    wherein the electronic control unit is configured to:
        determine the order of executing the processes to electrically charge the batteries as a predetermined charge order;
        execute the processes to electrically charge the batteries in accordance with the predetermined charge order;
        acquire a value correlating with a charge speed of a battery now charged as a charge speed correlation value of the battery now charged; and
        end the execution of the process to charge the battery now charged when the charge speed correlation value of the battery now charged indicates that the charge speed of the battery now charged becomes equal to or lower than a predetermined charge speed threshold.

2. The vehicle-installed battery charge system as set forth in claim 1, wherein the electronic control unit is further configured to:
    acquire a charge rate of the battery now charged as the charge speed correlation value, the charge rate of the battery now charged being a ratio of an amount of electric power which has been stored in the battery now charged relative to an upper limit of the amount of the electric power which can be maximally stored in the battery now charged; and determine that the charge speed correlation value indicates that the charge speed of the battery now charged becomes equal to or lower than the predetermined charge speed threshold when the charge rate of the battery now charged becomes equal to or greater than a predetermined charge rate threshold.

3. The vehicle-installed battery charge system set forth in claim 1, wherein the electronic control unit is further configured to:

acquire a temperature of the battery now charged as the charge speed correlation value; and determine that the charge speed correlation value indicates that the charge speed of the battery now charged becomes equal to or lower than the predetermined charge speed threshold when the temperature of the battery now charged becomes equal to or higher than a predetermined battery temperature threshold.

4. The vehicle-installed battery charge system as set forth in claim 1, wherein the electronic control unit is further configured to:

acquire a charge amount of the battery now charged as the charge speed correlation value, the charge amount of the battery now charged being an amount of electric power which has been stored in the battery now charged; and determine that the charge speed correlation value indicates that the charge speed of the battery now charged becomes equal to or lower than the predetermined charge speed threshold when the charge amount of the battery now charged becomes equal to or greater than a predetermined charge amount threshold.

5. The vehicle-installed battery charge system as set forth in claim 1, wherein the electronic control unit is further configured to:

acquire an output electric power amount as the charge speed correlation value, the output electric power amount being an amount of electric power which is output from the battery charge equipment to the battery now charged; and determine that the charge speed correlation value indicates that the charge speed of the battery now charged becomes equal to or lower than the predetermined charge speed threshold when the output electric power amount becomes equal to or smaller than a predetermined output electric power amount threshold.

6. The vehicle-installed battery charge system as set forth in claim 1, wherein the electronic control unit is further configured to:

acquire estimated charge-end time of the battery now charged as the charge speed correlation value, the estimated charge-end time of the battery now charged being time estimated to be required for an amount of electric power stored in the battery now charged to reach a target amount; and determine that the charge speed correlation value indicates that the charge speed of the battery now charged becomes equal to or lower than the predetermined charge speed threshold when the estimated charge-end time of the battery now charged becomes equal to or longer than a predetermined estimated charge-end time threshold.

7. The vehicle-installed battery charge system as set forth in claim 1, wherein the electronic control unit is further configured to:

acquire a remaining chargeable amount of the battery now charged as the charge speed correlation value, the remaining chargeable amount of the battery now charged being a difference between an amount of electric power stored in the battery now charged and an upper limit of the amount of the electric power which can be maximally stored in the battery now charged; and determine that the charge speed correlation value indicates that the charge speed of the battery now charged becomes equal to or lower than the predetermined charge speed threshold when the remaining chargeable amount of the battery now charged becomes equal to or smaller than a predetermined remaining chargeable amount threshold.

8. The vehicle-installed battery charge system as set forth in claim 1, wherein the electronic control unit is further configured to:

acquire a cooling water flow rate of the battery now charged as the charge speed correlation value, the cooling water flow rate of the battery now charged being a flow rate of cooling water requested to be supplied to the battery now charged to cool the battery now charged; and determine that the charge speed correlation value indicates that the charge speed of the battery now charged becomes equal to or lower than the predetermined charge speed threshold when the cooling water flow rate of the battery now charged becomes equal to or greater than a predetermined cooling water flow rate threshold.

9. The vehicle-installed battery charge system as set forth in claim 1, wherein the electronic control unit is further configured to:

acquire a charge rate difference of the battery now charged as the charge speed correlation value, (i) the charge rate difference of the battery now charged being a difference of a charge ratio of the battery now charged relative to the charge ratio of the battery scheduled to be charged next, (ii) a battery charge ratio of the battery now charged being a ratio of an amount of electric power which has been stored in the battery now charged relative to an upper limit of the amount of the electric power which can be maximally stared in the battery now charged, (iii) the charge ratio of the battery scheduled to be charged next being the ratio of the amount of the electric power which has been stored in the battery scheduled to be charged next relative to an upper limit of the amount of the electric power which, can be maximally stored in the battery scheduled to be charged next; and determine that the charge speed correlation value indicates that the charge speed of the battery now charged becomes equal to or lower than the predetermined charge speed threshold when the charge rate difference of the battery now charged becomes equal to or greater than a predetermined charge rate difference threshold.

10. The vehicle-installed battery charge system as set forth in claim 1, wherein the electronic control unit is further configured to:

acquire a battery temperature difference of the battery now charged as the charge speed correlation value, the battery temperature difference of the battery now charged being a difference of a temperature of the battery scheduled to be charged next, relative to the temperature of the battery now charged; and determine that the charge speed correlation value indicates that the charge speed of the battery now charged becomes equal to or lower than the predetermined charge speed threshold when the battery temperature difference of the battery now charged becomes equal to or greater than a predetermined battery temperature difference threshold.

11. The vehicle-installed battery charge system as set forth in claim 1, wherein the electronic control unit is further configured to:

acquire a charge amount difference of the battery now charged as the charge speed correlation value, the charge amount difference of the battery now charged being a difference of an amount of electric power which has been stored in the battery scheduled to be charged next relative to the amount of the electric power which has been stored in the battery now charged; and determine that the charge speed correlation value indicates that the charge speed of the battery now charged becomes equal to or lower than the predetermined charge speed threshold when the charge amount difference of the battery now charged becomes equal to or greater than a predetermined charge amount difference threshold.

12. The vehicle-installed battery charge system as set forth in claim 1, wherein the electronic control unit is further configured to:

acquire an output electric power amount difference as the charge speed correlation value, the output electric power amount difference being a difference of an output electric power amount of electric power which is output from the battery charge equipment to the battery now charged relative to the output electric amount of the electric power which is estimated to be output from the battery charge equipment to the battery scheduled to be charged next; and determine that the charge speed correlation value indicates that the charge speed of the battery now charged becomes equal to or lower than the predetermined charge speed threshold when the output electric power amount difference becomes equal to or greater than a predetermined output electric power amount difference threshold.

13. The vehicle-installed battery charge system as set forth in claim 1, wherein the electronic control unit is further configured to:

acquire an estimated charge-end time difference of the battery now charged as the charge speed correlation value, the estimated charge-end time difference of the battery now charged being a difference of time estimated to be required for an amount of electric power stored in the battery scheduled to be charged next to reach a target amount for the battery scheduled to be charged next relative to the time estimated to be required for the amount of the electric power stored in the battery now charged to reach a target amount for the battery now charged; and determine that the charge speed correlation value indicates that the charge speed of the battery now charged becomes equal to or lower than the predetermined charge speed threshold when the estimated charge-end time difference of the battery now charged becomes equal to or greater than a predetermined estimated charge-end time difference threshold.

14. The vehicle-installed battery charge system as set forth in claim 1, wherein the electronic control unit is further configured to:

acquire a remaining chargeable amount difference of the battery now charged as the charge speed correlation value, (i) the remaining chargeable amount difference of the battery now charged being a difference of a remaining chargeable amount of the battery now charged relative to the remaining chargeable amount of the battery scheduled to be charged next, (ii) the remaining chargeable amount of the battery now charged being a difference between an amount of electric power stored in the battery now charged and an upper limit of the amount of the electric power which can be maximally stored in the battery now charged, (iii) the remaining chargeable amount of the battery scheduled to be charged next being a difference between the amount of the electric power stored in the battery scheduled to be charged next and an upper limit of the amount of the electric power which can be maximally stored in the battery scheduled to be charged next; and determine that the charge speed correlation value indicates that the charge speed of the battery now charged becomes equal to or lower than the predetermined charge speed threshold when the remaining chargeable amount difference of the battery now charged becomes equal to or greater than a predetermined remaining chargeable amount difference threshold.

15. The vehicle-installed battery charge system as set forth in claim 1, wherein the electronic control unit is further configured to;

acquire a cooling water flow rate difference of the battery now charged as the charge speed correlation value, the cooling water flow rate difference of the battery now charged being a difference of a flow rate of cooling water requested to be supplied to the battery scheduled to be charged next to cool the battery scheduled to be charged next relative to the flow rate of the cooling water requested to be supplied to the battery now charged to cool the battery now charged; and determine that the charge speed correlation value indicates that the charge speed of the battery now charged becomes equal to or lower than the predetermined charge speed threshold when the cooling water flow rate difference of the battery now charged becomes equal to or greater than a predetermined cooling water flow rate difference threshold.

16. The vehicle-installed battery charge system as set forth in claim 1, wherein the battery charge equipment includes a connection arm which connects a charge connector of a charge cable used for electrically charging the battery to a charge inlet of the vehicle and disconnects the charge connector from the charge inlet, and wherein the electronic control unit is further configured to:

disconnect the charge connector from the charge inlet of the vehicle having the battery now charged by the connection arm when the electronic control unit ends the execution of the process to electrically charge the battery now charged;

connect the disconnected charge connector to the charge inlet of the vehicle having the battery scheduled to be charged next by the connection arm; and start the execution of the process to electrically charge the battery scheduled to be charged next.

17. The vehicle-installed battery charge system as set forth in claim 1, wherein the electronic control unit is further configured to charge a user of the vehicle a higher fee for electrically charging the battery when the charge speed correlation value is small, compared with when the charge speed correlation value is large.

18. The vehicle-installed battery charge system as set forth in claim 1, wherein the electronic control unit is further configured to determine the order of executing the processes to electrically charge the batteries such that the process to electrically charge the battery requested to be electrically charged at an earlier point of time is executed early.

\* \* \* \* \*